United States Patent
Kreiner et al.

(10) Patent No.: US 9,413,742 B2
(45) Date of Patent: Aug. 9, 2016

(54) SYSTEMS, METHODS AND APPARATUS TO APPLY PERMISSIONS TO APPLICATIONS

(71) Applicant: AT&T Intellectual Property I, L.P., Atlanta, GA (US)

(72) Inventors: Barrett Kreiner, Woodstock, GA (US); Jonathan Reeves, Roswell, GA (US); Ryan Schaub, Norcross, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 14/465,929

(22) Filed: Aug. 22, 2014

(65) Prior Publication Data

US 2014/0359729 A1  Dec. 4, 2014

Related U.S. Application Data

(63) Continuation of application No. 12/963,495, filed on Dec. 8, 2010, now Pat. No. 8,826,436.

(51) Int. Cl.
*H04L 29/06* (2006.01)
*G06F 21/51* (2013.01)
(Continued)

(52) U.S. Cl.
CPC ............... *H04L 63/08* (2013.01); *G06F 21/51* (2013.01); *G06F 21/53* (2013.01); *H04L 63/10* (2013.01);
(Continued)

(58) Field of Classification Search
CPC ....... H04L 63/08; H04L 63/10; H04L 63/105; H04L 63/168; H04L 63/0823; G06F 21/33; G06F 21/42; H04W 12/06; H04W 88/00
See application file for complete search history.

(56) References Cited

U.S. PATENT DOCUMENTS 5,832,228 A * 11/1998 Holden ................. G06F 21/606
   709/225
6,154,751 A   11/2000 Ault et al.
(Continued)

OTHER PUBLICATIONS

"Are free software like malwarebytes antimalware; spybotsearch and destroy; ad aware any good?" Yahoo! UK & Ireland Answers, Aug. 11, 2009, http://uk.answers.yahoo.com/question/index?qid=20090811072247AAMIDPO (3 pages).
(Continued)

*Primary Examiner* — Saleh Najjar
*Assistant Examiner* — Shu Chun Gao
(74) *Attorney, Agent, or Firm* — Hanley, Flight & Zimmerman, LLC

(57) ABSTRACT

Methods and apparatus are disclosed to apply permissions to applications. A disclosed example apparatus includes an address trust manager to obtain a first network address having a request for address authentication from a first entity, the first network address having a second network address associated with a second entity to execute the application, an address associator to compare the first network address to a trusted address database to determine whether the first network address is trusted, and a shadow environment communicator to generate a signed message based on the comparison of the trusted address database, the address trust manager to transmit the signed message to the second entity with an indication of authorization via the first network address in response to a match in the trusted address database, and transmit the signed message to the second entity with an indication of non-authorization via the first network address in response to a lack of a match in the trusted address database.

20 Claims, 8 Drawing Sheets

(51) Int. Cl.
*G06F 21/53* (2013.01)
*H04L 29/08* (2006.01)

(52) U.S. Cl.
CPC .............. *H04L 63/102* (2013.01); *H04L 67/34* (2013.01); *G06F 2221/2105* (2013.01); *H04L 2463/103* (2013.01)

(56) References Cited

U.S. PATENT DOCUMENTS

| | | | |
|---|---|---|---|
| 6,772,345 | B1 | 8/2004 | Shetty |
| 7,096,500 | B2 | 8/2006 | Roberts et al. |
| 7,440,471 | B1 | 10/2008 | Hinchliffe et al. |
| 7,627,658 | B2 | 12/2009 | Levett et al. |
| 7,747,849 | B2 | 6/2010 | Clevy et al. |
| 7,831,693 | B2 | 11/2010 | Lai |
| 8,296,828 | B2 | 10/2012 | Dalzell et al. |
| 8,826,436 | B2 * | 9/2014 | Kreiner ................ H01L 63/102 705/59 |
| 2001/0016878 | A1 * | 8/2001 | Yamanaka .............. H04L 12/14 709/234 |
| 2002/0194584 | A1 * | 12/2002 | Suorsa ....................... G06F 8/60 717/176 |
| 2004/0107285 | A1 * | 6/2004 | Larson ................... H04L 63/10 709/229 |
| 2005/0086537 | A1 | 4/2005 | Johnson |
| 2005/0272465 | A1 * | 12/2005 | Ahmavaara ........... H04L 63/162 455/552.1 |
| 2006/0122944 | A1 * | 6/2006 | Ryan ..................... G06Q 10/08 705/67 |
| 2007/0067841 | A1 | 3/2007 | Yegneswaran et al. |
| 2007/0079356 | A1 | 4/2007 | Grinstein |
| 2007/0261112 | A1 | 11/2007 | Todd et al. |
| 2008/0114695 | A1 | 5/2008 | Gutierrez |
| 2008/0134288 | A1 * | 6/2008 | Halasz .................. H04W 12/06 726/2 |
| 2008/0189757 | A1 | 8/2008 | Schackow et al. |
| 2009/0064332 | A1 | 3/2009 | Porras et al. |
| 2009/0217379 | A1 | 8/2009 | Chang et al. |
| 2009/0249482 | A1 * | 10/2009 | Sarathy ................. G06F 21/567 726/22 |
| 2010/0037314 | A1 | 2/2010 | Perdisci et al. |
| 2010/0057836 | A1 | 3/2010 | Anbuselvan |
| 2011/0083185 | A1 * | 4/2011 | Sheleheda ............ G06F 21/552 726/24 |

OTHER PUBLICATIONS

United States Patent and Trademark Office, "Non-Final Office Action," issued in connection with U.S. Appl. No. 12/963,495, on Dec. 26, 2012 (13 pages).

United States Patent and Trademark Office, "Non-Final Office Action," issued in connection with U.S. Appl. No. 12/963,495, on Sep. 25, 2013 (21 pages).

United States Patent and Trademark Office, "Notice of Allowance," issued in connection with U.S. Appl. No. 12/963,495, on Apr. 29, 2014 (8 pages).

* cited by examiner

SYSTEMS, METHODS AND APPARATUS TO APPLY PERMISSIONS TO APPLICATIONS

RELATED APPLICATIONS

This patent arises from a continuation of and claims the benefit of and priority to U.S. patent application Ser. No. 12/963,495 (now U.S. Pat. No. 8,826,436), entitled "Systems, Methods and Apparatus to Apply Permissions to Applications," and filed on Dec. 8, 2010, which is hereby incorporated herein by reference in its entirety.

FIELD OF THE DISCLOSURE

This disclosure relates generally to network security and, more particularly, to systems, methods and apparatus to apply permissions to applications.

BACKGROUND

In recent years, software developers have reduced the number of compact discs (CD), digital versatile discs (DVD) or other physical media when deploying applications for consumer use. Instead, software developers have taken advantage of suitable network speed and bandwidth to deploy applications over the networks, thereby saving material production costs and allowing rapid distribution of application version update(s). In some circumstances, consumer demands for obtaining the application(s) via network download (e.g., Internet download) motivate the software developers to employ one or more mirror hosts to handle network demands for the application(s) so that the software developer does not have to purchase expensive networking hardware (e.g., server farms) to handle application distribution.

DETAILED DESCRIPTION

Figure 1:
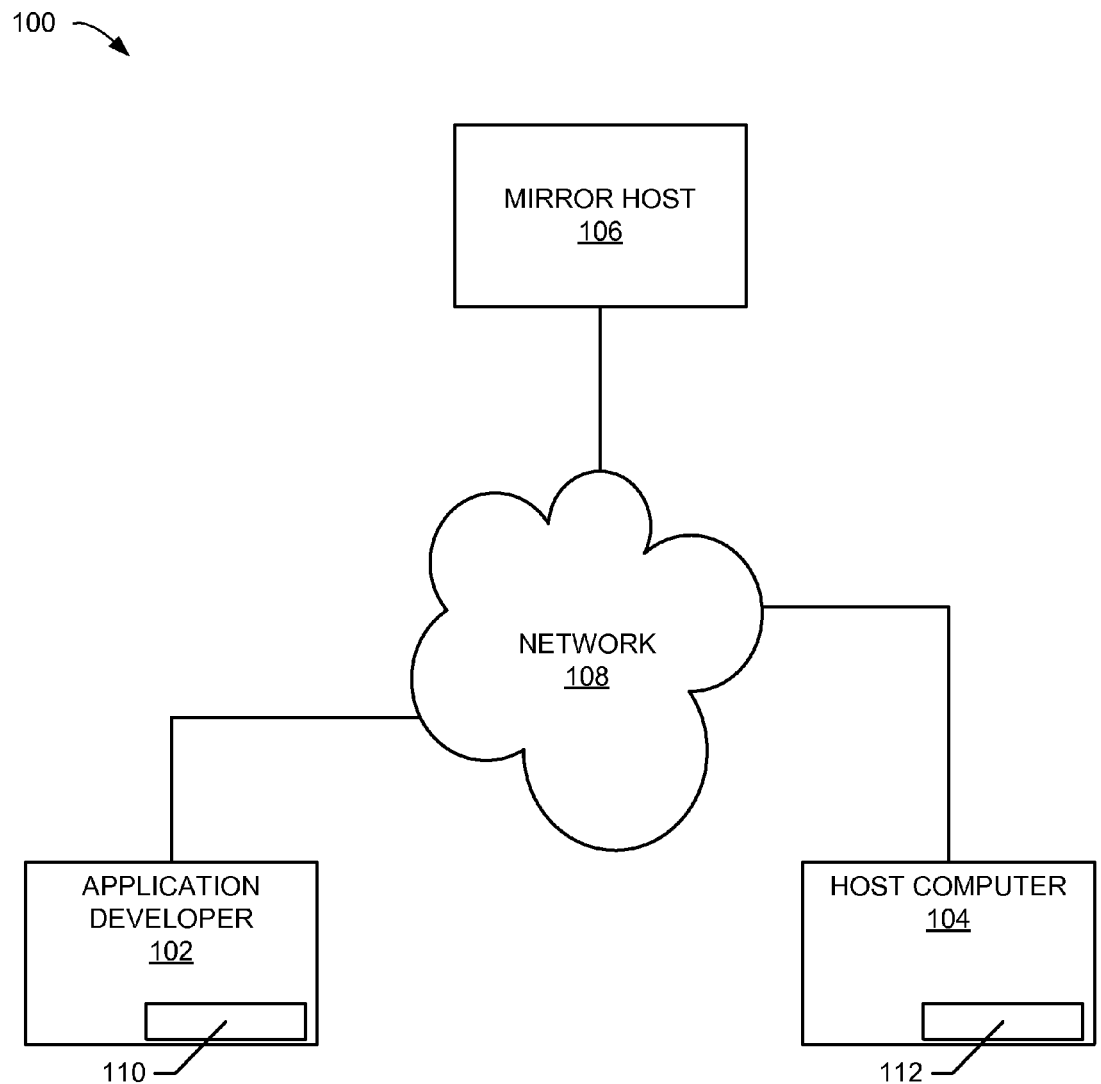
FIG. 1 is a schematic illustration of a network environment showing an example system to apply permissions to applications.

Methods and apparatus are disclosed to apply permissions to applications. A disclosed example method includes navigating to a first network address of a first network entity and downloading an application from the first network entity, disabling all network address communication except for the first network address, sending an authorization request to a second network entity via the first network address, and authorizing the application to execute when an indication of authentication is received from the second network entity via the first network address.

In many circumstances, malware propagation occurs when a software application is downloaded from an untrustworthy source. While a software application desired by a user performs one or more services expected by the user, such software applications may be packaged together with other programs not authored by the software developer. For example, legitimate software applications may be packaged together with malware (e.g., malicious software, such as computer viruses, worms, Trojan horses, spyware, adware, etc.) on a third-party hosting website (e.g., a mirror). While the legitimate software may operate as intended, the packaged malware may operate to utilize the user's computer for illegitimate, illegal and/or unauthorized purposes.

Malware (e.g., viruses) is typically a program and/or other code loaded on a computer of a user (a host computer) that, when executed, performs one or more undesired actions. In some cases, the undesired actions occur without the user's immediate knowledge and/or consent. However, in other cases, the user may suspect malware activity in response to observing degraded host computer performance, such as slower network speeds, slower host computer response time, and/or undesired pop-up advertisements.

Further propagation of the malware inadvertently installed by the user occurs by way of utilization of network resources on the user's computer. For example, after the malware is installed, it identifies available network resources for opportunities to infect other computers that may reside on the same network. In other examples, the installed malware uses the computer networking resources to send back sensitive information collected from a hard drive of the computer (e.g., passwords, social security numbers, bank account numbers, etc.).

Some modern operating systems (OSs) alert the user that an application wishes to make changes on the computer before that application may proceed. For example, the User Account Control (UAC) of Windows® 7 alerts the user that an application from an unknown publisher wishes to make changes, and provides the user with an opportunity to allow or deny further execution. In some circumstances, a user that is intentionally installing software and/or applications will indiscriminately allow the application to proceed, or will assume that the reason for the UAC message is in direct response to the installation process that the user initiated. Unfortunately, the malware is then provided an opportunity to be installed on the computer and begin using the computer's resources to send/receive information to/from network resources (other computers, servers, previously infected computers, bots, etc.) operated by the malware author.

Although some anti-virus software applications may monitor a computer for instances of known malware execution process initiation, such safeguards typically require both up-to-date anti-virus libraries and/or a known malware process signature. The systems, methods and apparatus described herein prevent a malicious application from accessing other networks and/or corrupting a host computer by, in part, allowing the application to operate without the perception of being constrained. By generating a shadow environment, the application may operate in an uninhibited manner while constraining the application's execution effects to one or more shadow resources (e.g., virtual resources rather than actual host computer system resources) having limited computer system resource allocation. In other words, the application is provided with system resources in a manner that appears to be a legitimate and entire computer system, but any actions the application invokes upon the shadow environment has no adverse effect on actual host computer resources. At least one benefit from the systems, methods and apparatus described herein is that any newly installed application obtained from a network download may execute under a monitored environment without access to actual host computer resources. Additionally, any initial attempts by the newly downloaded application to access a network address other than that from which the application was downloaded are restricted to shadow environment resources (e.g., a virtual or shadow network resource) rather than the actual host computer network resource(s), thereby preventing would-be malware from propagating any further. In the event that the host computer does not have anti-virus software, does not have an updated library of potential virus signature activity and/or the anti-virus software has not yet established a defense against one or more viruses, the methods, systems, articles of manufacture and apparatus described herein facilitate user protection against malware.

FIG. 1 is a schematic illustration of a network environment 100 including an application developer 102, a host computer 104 and a mirror host 106, each of which is communicatively connected to a network 108, such as an intranet or the Internet. In the illustrated example of FIG. 1, the application developer 102 may include one or more network elements (e.g., routers, servers, computers, etc.) to establish a presence in the network environment 100 as a node, such as an addressable node on the Internet. The example application developer 102 may receive requests for services of one or more applications for which it is responsible when executing on one or more host computers, such as the example host computer 104. For example, the host computer 104 may execute a word processing application, which relies upon updates from the application developer 102 from time-to-time (e.g., new font updates, security updates, etc.).

The example application developer 102 may have a limited number of network elements capable of providing downloading services to its client base. To allow the application developer 102 to distribute its application(s), application update(s) and/or application services (e.g., new font updates, security updates, etc.), the example application developer 102 may provide one or more copies of the application (e.g., executable computer source code) to the example mirror host 106. In some examples, the mirror host 106 may be an exact copy of a web site created by the example application developer 102, while in other examples, the mirror host 106 may be a third party that provides download services to relieve and/or balance network processing burdens of the example application developer 102.

In the event the application becomes popular and causes an increase in network bandwidth at the application developer 102, the example application developer 102 may not have sufficient network resources to keep up with download request demands. For example, the first month after release of a new application may be particularly busy and require substantial network bandwidth and server processing resources, while subsequent months may not require such intense demands. Thus, if significant money was expended to provision networking resources (e.g., network servers) of the example application developer 102, those networking resources will be substantially underutilized when initial popularity and/or demand decreases. By hosting the application on the example mirror host 106 (sometimes referred to as a third party file server, third party file share, mirror site, mirror, mirror service, etc.), the application developer 102 can provide its application to clients without expending capital on extra servers, routers and/or other networking elements and/or services to accommodate client downloading demands. For particularly popular applications, the mirror host 106 owner benefits by way of advertising revenue based on the number of web visitors to the mirror host 106.

While a mirror host, such as the example mirror host 106 of FIG. 1, can alleviate networking demands imposed on the example application developer 102, some mirrors may not operate in a trustworthy manner. For example, some mirror hosts (and/or other web sites that can host the application) package the target application with other software. In some instances, the other software packaged with the target application is not intended to cause harm, such as browser toolbars, weather widgets, instant messenger applications, etc. In other instances, malware is packaged with the target application and installs without the user's knowledge, which may scan the user's computer for sensitive information and transmit that information to an address on the Internet monitored by the author/creator of the malware application.

In operation, the example application developer 102 employs an address trust manager 110 to apply permissions to applications. As described in further detail below, the example address trust manager 110 receives a request for services from one or more host computers, such as the example host computer 104, based on an application downloaded from the example mirror host 106. The request for services includes information indicative of the network address from where the application was originally obtained and/or otherwise downloaded by the example host computer 104. If the information indicative of the originating network address (from where the application was downloaded) is associated with a trusted address, then the example address trust manager 110 provides one or more services to the requesting host computer 104. The one or more services may include, but are not limited to enabling application function(s), providing updates, proving an unlock code to the application, etc. In other examples, the address trust manager 110 may provide one or more additional and/or alternate addresses to the example host computer 104, which may be used by the host computer 104 to enable functionality of the downloaded application.

The example host computer 104 also includes a host manager 112 to apply permissions to applications. As described in further detail below, any application(s) downloaded by the host computer 104 from the example mirror host 106 are executed in a shadow environment generated by the host manager 112. In the illustrated example of FIG. 1, the host manager 112 generates an environment for application execution that prevents potential malware from adversely affecting one or more actual resources of the host computer 104. For example, the host manager 112 may allow the application to access a contacts list and monitor what behavior the application invokes. In some examples, the host manager 112 may generate a copy of a real contacts list, a subset of the real contacts list, or a fake (e.g., honeypot) contacts list so that, in the event that the application is malicious, no harm comes to the real contacts list and the application is unaware that its behavior is being monitored. Additionally, the example host manager 112 constrains communication attempts by the downloaded application to the address from where the application was downloaded. In this manner, the application may not propagate malware to one or more other host computers on the example network 108 and, instead, rely only upon a single network accessible address. The host manager 112 uses the single network accessible address to activate the application and/or attempt to obtain services from the example application developer 102. If corresponding requested services are not received (e.g., within a threshold period of time), or if one or more application authorization codes are not received, the example host manager 112 can delete the recently downloaded application from the host computer 104 to prevent potential damage due to suspected malware code.

Figure 2:
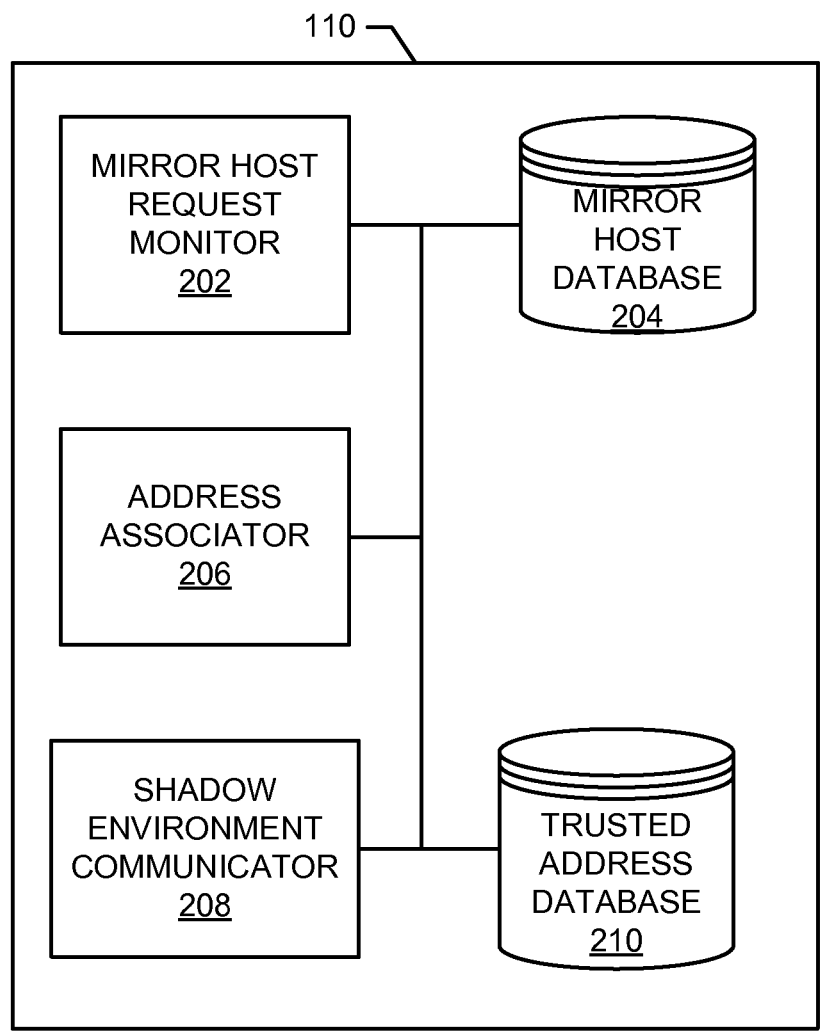
FIG. 2 is a schematic illustration of an example address trust manager that may be used in the system of FIG. 1.

FIG. 2 is a schematic illustration of the address trust manager 110 of FIG. 1. In the illustrated example of FIG. 2, the address trust manager 110 includes a mirror host request monitor 202, a mirror host database 204, an address associator 206 and a shadow environment communicator 208. In operation, the example mirror host request monitor 202 monitors for one or more requests to cache or mirror an application. In the event that the third party requestor (e.g., a file hosting/mirror website, such as www.tucows.com, www.download.cnet.com, etc.), such as the example mirror host 106, is deemed a trusted entity to host, cache and/or mirror the application, then the example mirror host request monitor 202 may store the address of the third party in the example mirror host database 204. On the other hand, in the event that the third party requestor, such as the example mirror host 106, is deemed untrustworthy, then the example mirror host request monitor 202 may refrain from adding the requestor's network address in the example mirror host database 204 or remove the third party requestor's network address from the mirror host database 204 if it was already present.

After the example mirror request monitor 202 adds the network address of the example mirror host 106 to the example mirror host database 204, any subsequent request received by the address trust manager 110 may be processed to apply permissions to applications. For example, if the example host computer 104 uses the network address of the example mirror host 106 to activate the application recently downloaded from the mirror host 106, the example address associator 206 searches the example mirror host database 204 for a matching network address. If a matching network address is found by the address associator 206 in the mirror host database 204, then the example shadow environment communicator 208 generates a response message for the host manager 112. The response message may include an activation code to allow the application to execute on the host computer 104 with or without limited access to resources of the host computer 104. In other examples, the response message may include one or more updates to allow the application to execute, such as one or more new features and/or security updates. In still other examples, the response message sent from the shadow environment communicator 208 to the host manager 112 may include encrypted credentials and/or a signature to allow the host manager 112 to verify that communication is authentic and/or from a known and/or trusted source. As described in further detail below, the example host manager 112 may include an encryption engine to receive one or more communications from the shadow environment communicator 208 to verify authenticity.

In some examples, the response message sent from the shadow environment communicator 208 to the host manager 112 of the host computer 104 may include one or more trusted network addresses. The one or more trusted network addresses may be used in addition to or instead of the initial network address used by the host manager 112 in response to executing the application for the first time. The one or more trusted network addresses may be stored in the example trusted address database 210, which may include iPv4 and/or iPv6 network addresses. At least one benefit for providing one or more trusted network addresses to the host manager 112 of the host computer 104 is so that users of the host computer 104 may continue to use the downloaded application even after the mirror host 106 is unavailable and/or later deemed to be untrustworthy. For example, if the mirror host 106 is deemed trustworthy during a first period of time, in which users download an application, then the corresponding address of the mirror host 106 is also deemed trustworthy during that first period of time, thereby allowing the application to function. However, if the mirror host 106 is found untrustworthy at a second time, then users that previously downloaded the application will lose their ability to use the application because the mirror host 106 address was revoked. Despite a lack of trust of the mirror host 106 at the second time, those applications downloaded by the users at the first time may not be at risk of malware, thus, there is no reason to prohibit those users from continuing to receive services of the application and/or the application developer 102 (e.g., periodic updates, etc.). The effect of revoking the address of the mirror host 106 at the second time is to prohibit future download attempts via the mirror host 106 and minimize and/or eliminate the possibility of malware propagation.

Figure 3:
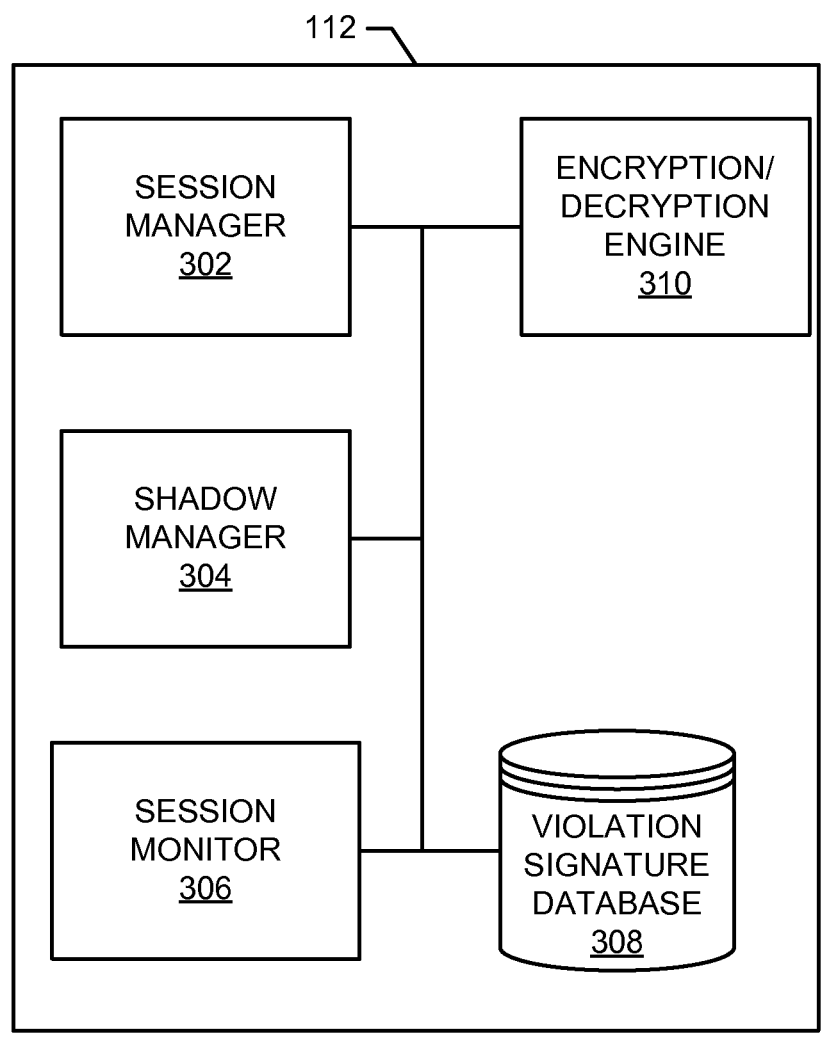
FIG. 3 is a schematic illustration of an example shadow environment manager that may be used in the system of FIG. 1.

Turning to FIG. 3, the example host manager 112 includes an example session manager 302, an example shadow manager 304, an example session monitor 306, an example violation signature database 308, and an example encryption/decryption engine 310. In the illustrated example of FIG. 3, the session manager 302 initializes a sandbox session in response to execution of the application downloaded from the mirror host 106 to the host computer 104. The shadow environment may begin in response to a user attempt at executing the downloaded application, or may begin in response to the download operation from the mirror host 106 ending.

As described in further detail below, the shadow environment initializes in a manner that allows the downloaded application to execute, which includes a shadow registry, a shadow file system, and/or any other shadow resource(s). The shadow environment may also constrain other operating parameters of the application including, but not limited to an allocated CPU utilization for the application, an allocated amount of RAM utilization for the application and a single network address through which all communication attempts are routed. The shadow environment may provide responses to the executing application to make it appear as though it has unfettered access to the host on which it executes. The example shadow manager 304 creates the shadow registry and/or shadow file system (and/or other shadow resources) in a manner that reflects the structure of the registry and/or file system of the host computer 104. However, any changes made by the application to the shadow registry and/or shadow file system do not affect performance of the host computer 104. Instead, the example session monitor 306 monitors the behavior of the application to determine whether or not the application is behaving in a safe manner. The example session monitor 306 may employ the example violation signature database 308 to look for behavioral signatures indicative of dangerous application behavior.

Additionally, the downloaded application must perform its initial communication from the example host computer 104 to the network 108 through the same network address from where the application was downloaded. For example, if the application is downloaded from the example mirror host 106, then the example session manager 302 constrains communication attempts by the application to occur to the network address of the mirror host 106. As described in further detail below, the network address of the mirror host 106 may be used by the host manager 112 to communicate to the application developer 102. In some examples, the network address used by the host manager 112 includes a base address indicative of the mirror host 106 and a secondary address indicative of the application developer 102. When the address trust manager 110 approves the network address used by the host manager 112, the example shadow environment communicator 208 forwards one or more messages back to the session manager 302 to permit further execution of the application, provide one or more alternate/additional network addresses, and/or apply updates to the application.

Messages sent by the example address trust manager 110 may be generated with a hash and/or a private key to enable verification by the example host manager 112. For example, the shadow environment communicator 208 may generate one or more messages using a hash and/or private key to create a signature attached to the data to be sent. When received by the example encryption/decryption engine 310 of the host manager 112, the digitally signed data may be decrypted with a public key to reveal the hash and the hash may also be derived via the received data and a hash function. In the event that the derived hash and the decrypted hash are equal, then the host manager 112 can confirm that the signature is valid and the received message is actually from the application developer 102 rather than a rouge network entity.

While an example manner of implementing address trust manager 110 and the host manager 112 of FIGS. 1 and 2 are illustrated in FIGS. 2 and 3, one or more of the elements, processes and/or devices illustrated in FIGS. 2 and 3 may be combined, divided, re-arranged, omitted, eliminated and/or implemented in any other way. Further, the example address trust manager 110, the example mirror host request monitor 202, the example mirror host database 204, the example address associator 206, the example shadow environment communicator 208 and/or the example trusted address database 210 of FIG. 2, and/or the example host manager 112, the example session manager 302, the example shadow manager 304, the example session monitor 306, the example violation signature database 308 and/or the example encryption/decryption engine 310 of FIG. 3 may be implemented by hardware, software, firmware and/or any combination of hardware, software and/or firmware. Thus, for example, any of the example address trust manager 110, the example mirror host request monitor 202, the example mirror host database 204, the example address associator 206, the example shadow environment communicator 208 and/or the example trusted address database 210 of FIG. 2, and/or the example host manager 112, the example session manager 302, the example shadow manager 304, the example session monitor 306, the example violation signature database 308 and/or the example encryption/decryption engine 310 of FIG. 3 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example address trust manager 110, the example mirror host request monitor 202, the example mirror host database 204, the example address associator 206, the example shadow environment communicator 208 and/or the example trusted address database 210 of FIG. 2, and/or the example host manager 112, the example session manager 302, the example shadow manager 304, the example session monitor 306, the example violation signature database 308 and/or the example encryption/decryption engine 310 are hereby expressly defined to include a computer readable medium such as a memory, DVD, CD, etc. storing the software and/or firmware. Further still, the example address trust manager 110 and/or the example host manager 112 of FIGS. 1-3 may include one or more elements, processes and/or devices in addition to, or instead of, those illustrated in FIGS. 1-3, and/or may include more than one of any or all of the illustrated elements, processes and devices.

Figure 4A:
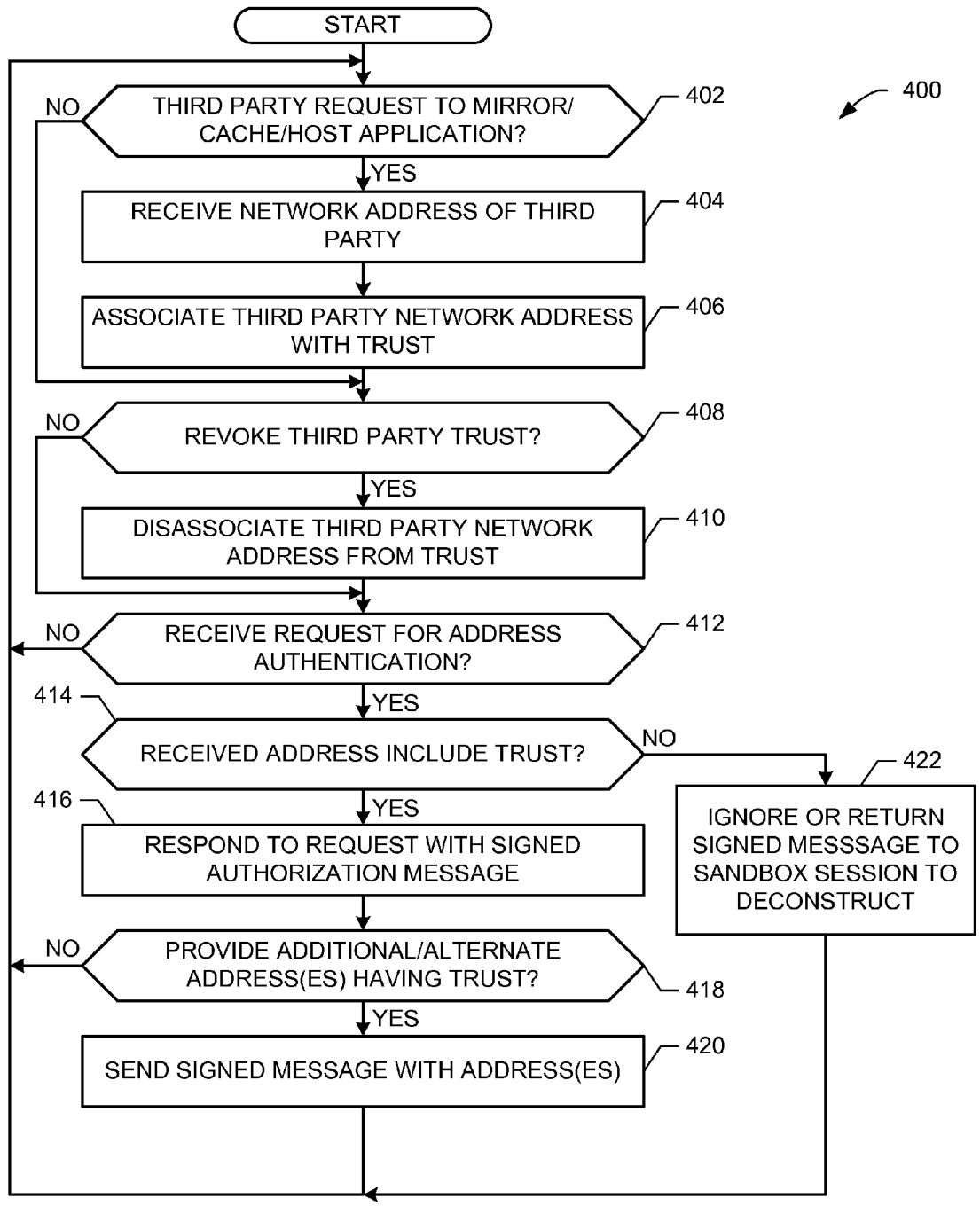
FIGS. 4A, 5A and 5B are flowcharts representative of example machine readable instructions that may be executed by the example system shown in FIG. 1.
Figure 5A:
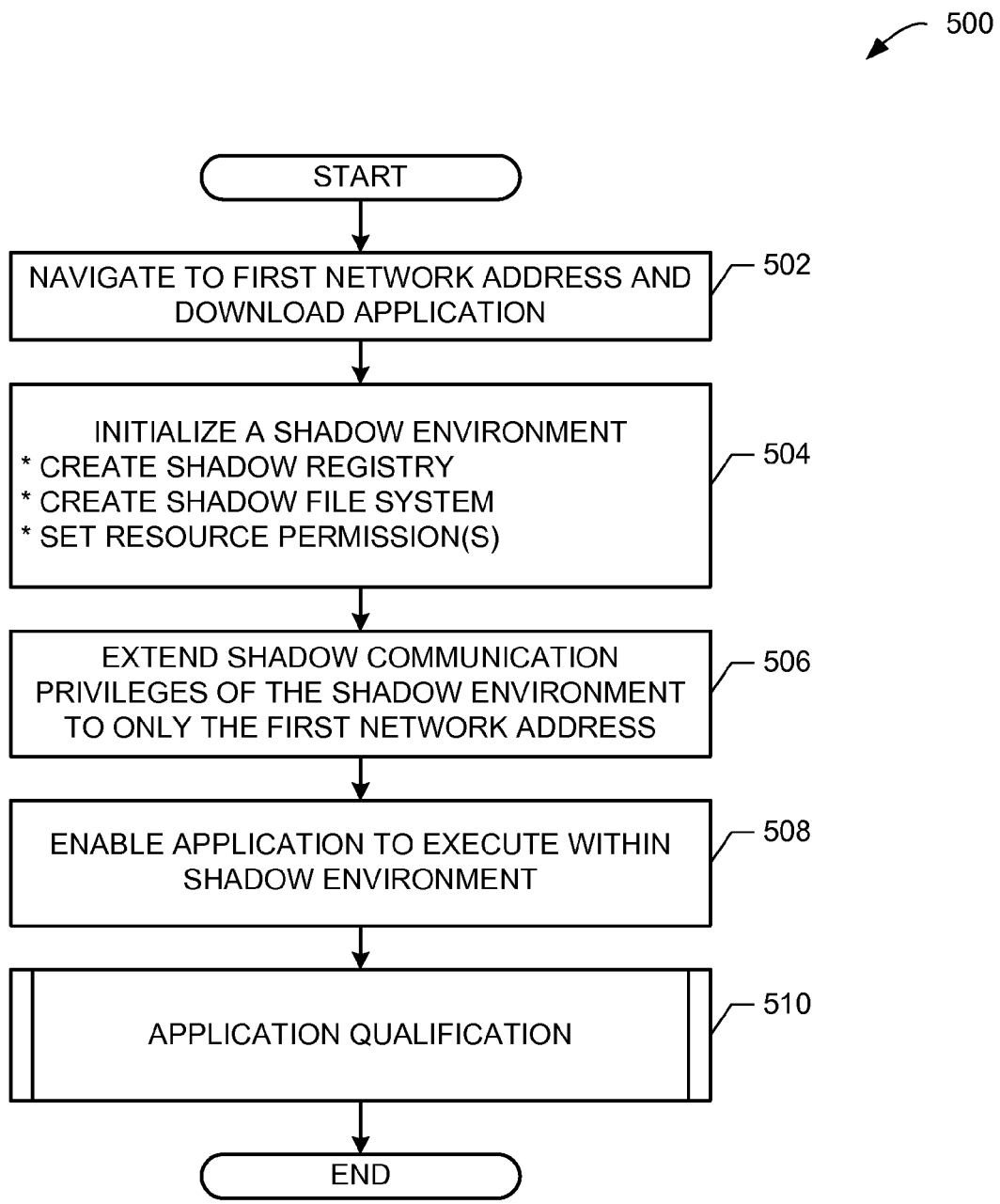
Figure 5B:
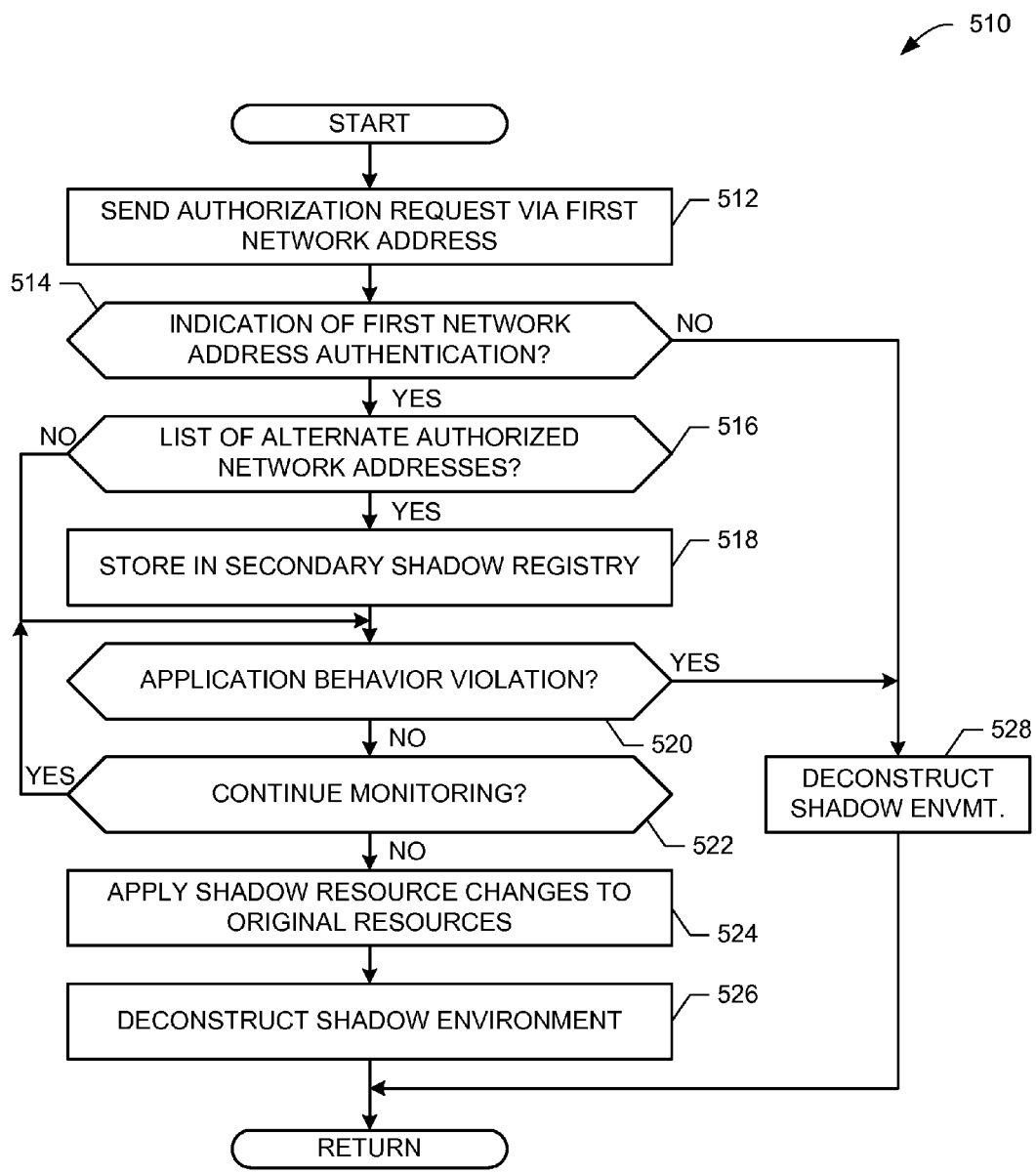

Flowcharts representative of example machine readable instructions for implementing the address trust manager 110 and the host manager 112 of FIGS. 1-3 are shown in FIGS. 4A, 5A and 5B. In these examples, the machine readable instructions comprise a program for execution by a processor such as the processor P105 shown in the example computer P100 discussed below in connection with FIG. 6. The machine readable instructions may be embodied in software stored on a computer readable medium such as a CD-ROM, a floppy disk, a hard drive, a digital versatile disk (DVD), or a memory associated with the processor P105, but the entire machine readable instructions and/or parts thereof could alternatively be executed by a device other than the processor P105 and/or embodied in firmware or dedicated hardware. Further, although the example machine readable instructions are described with reference to the flowcharts illustrated in FIGS. 4A, 5A and 5B, many other methods of implementing the example address trust manager 110 and the example host manager 112 may alternatively be used. For example, the order of execution of the blocks may be changed, and/or some of the blocks described may be changed, eliminated, or combined.

As mentioned above, the example machine readable instructions of FIGS. 4A, 5A and 5B may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example machine readable instructions of FIGS. 4A, 5A and 5B may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

The machine readable instructions 400 of FIG. 4A begin at block 402 where the example mirror request monitor 202 monitors for a request for permission to cache or mirror an application. Generally speaking, some third party file servers, cache sites and/or mirror sites (hereinafter referred to herein as "third party mirror hosts") seek potential revenue from website advertising. In the event that Internet users use the third party mirror host that is hosting an application that is particularly popular, advertising revenue increases. Hosting applications from developers of popular applications may be desired by the third party mirror hosts to attract a greater number of visitors and, consequently, a greater number of advertising impressions from those visitors. In the event that the example mirror host request monitor 202 identifies a request (block 402), the mirror host request monitor 202 receives a corresponding network address associated with the third party mirror host (block 404). The example mirror host request monitor 202 associates the network address of the third party mirror host with an indication of trust, such as a flag stored in the example mirror host database 204 (block 406).

If the example mirror host request monitor 202 does not receive a request for permission to cache or mirror an application (block 402), or after the third party mirror host network address is associated with an indication of trust (block 406), the example mirror host request monitor 202 determines whether a received network address already associated with a third party mirror host should have its trust revoked (block 408). If so, then the example address associator 206 changes the flag in the example mirror host database 204 that is associated with the third party mirror host to disassociate the third party network address and represent an indication of revoked trust (block 410). For example, the example mirror host database 204 may store a list of third party mirror host network addresses in a first column, and store a corresponding flag value in a second column having a trust value setting. Affirmative trust value settings may be represented as, but not limited to "trusted," "true," or "1." On the other hand, revoked trust value settings may be represented as, but not limited to "untrusted," "false," or "0."

If the example address associator 206 does not revoke trust credentials from a previously trusted third party mirror host (block 408), or after a third party mirror host has had its trust revoked (block 410), the example shadow environment communicator 208 determines whether a request is made from a host manager (e.g., the host manager 112 of FIGS. 1 and 3) for authentication from an application executing on a host computer 104 (block 412). If not, then the example address trust manager 110 continues to monitor for additional requests by third party mirror hosts to host the application (block 402), to revoke third party trust (block 408), or to process requests for address authentication (block 412).

On the other hand, if a request is made for authentication from an application executing on a host computer 104 (block 412), the example shadow environment communicator 208 determines whether the received address in the request is associated with an indication of trust (block 414). To determine whether the received address is associated with an indication of trust, the example shadow environment communicator 208 may query the example trusted address database 210. If the address is trusted (block 414), then the example shadow environment communicator 208 responds to the requesting host manager (e.g., the host manager 112 of FIGS. 1 and 3) via the mirror host 106 with a signed authentication message, thereby enabling some or all of the functionality of the application executing on the host computer 104 (block 416). As described above, the example address trust manager 110 responds via the mirror host 106 because the downloaded application is not authorized to send or receive any communication from a network address other than that of where the application was originally downloaded.

In some examples, the application developer 102 may provide additional and/or alternate network addresses to the host computer 104, in which the additional and/or alternate network addresses are associated with trust. While the third party mirror host may be deemed a trustworthy host for the application(s) designed and/or managed by the application developer 102 at a first time, the third party mirror host may later choose to disassociate the third party mirror host from the privilege of hosting the application(s) at a second time (e.g., due to a loss of trust, business related relationship termination, etc.). When the application developer 102 chooses to disassociate the third party mirror host from the hosting privilege, the network address associated with the third party mirror host is revoked, as described above. However, to allow those users that downloaded the application at the first time to continue to execute the application, one or more additional/alternate network addresses will allow them continued service, while any new attempts at downloading the application from the third party mirror host will not be able to activate and/or otherwise use the application. If the application developer 102 chooses to provide additional/alternate network address(es) associated with trust (block 418), then such address(es) are signed and sent to the host manager 112 as a signed message (block 420). Control then returns to block 402, where the example mirror request monitor 202 monitors for a request for permission to cache or mirror an application.

For circumstances in which the shadow environment communicator 208 determines that a host manager (e.g., the host manager 112 of FIGS. 1 and 3) has sent a request with an associated address absent an indication of trust (block 414), then the example shadow environment communicator 208 ignores the request (block 422). In other examples, the example shadow environment communicator 208 may return a signed message to the host manager 112 to deconstruct any shadow environment session(s) that may have been initiated at a host computer 104 for fear that the downloaded application is rogue.

Figure 4B:
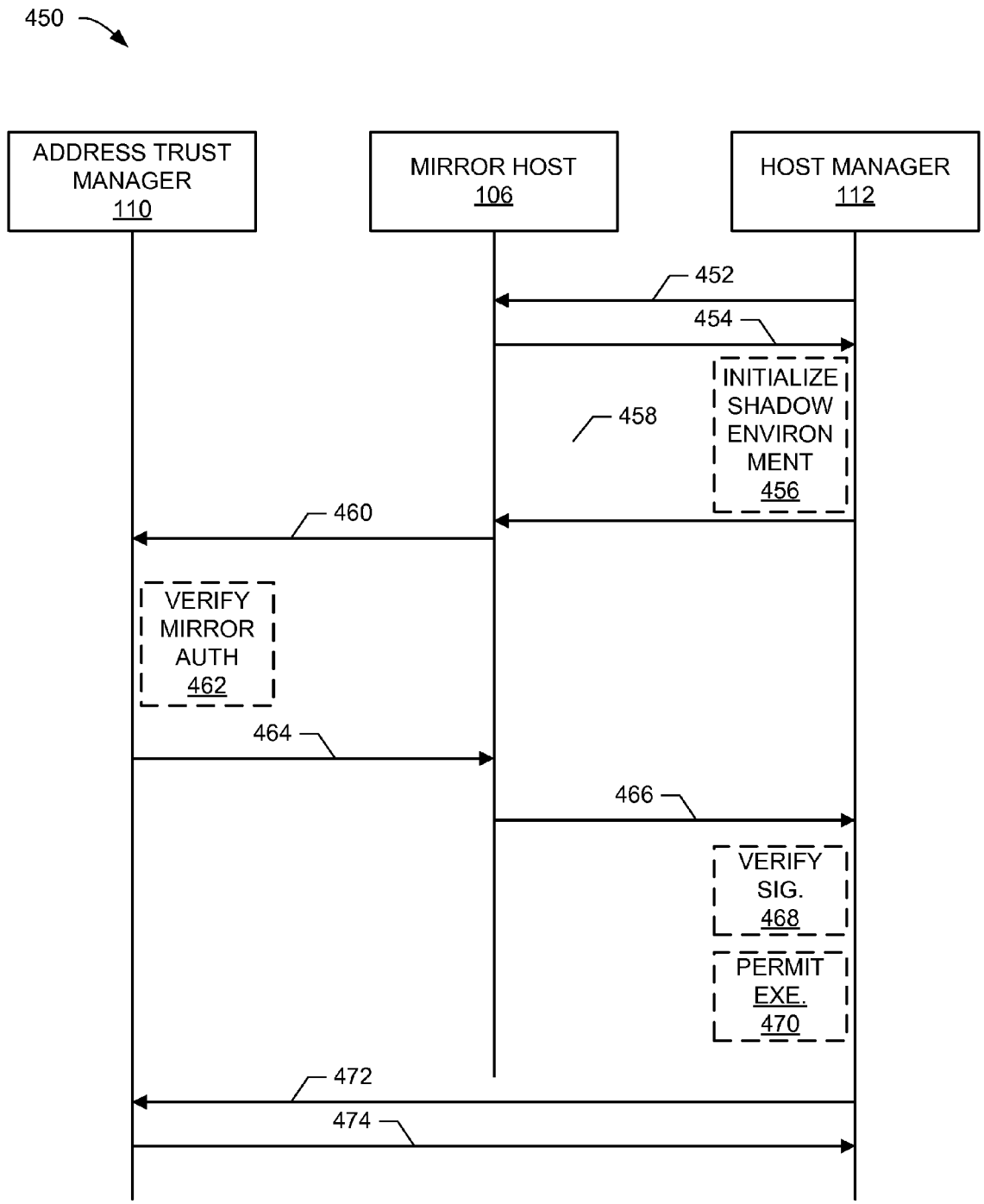
FIG. 4B is a message diagram representative of example communication between elements of the example system shown in FIGS. 1-3.

In the illustrated example of FIG. 4B, a message diagram 450 includes the address trust manager 110, the mirror host 106, and the host manager 112. In operation, a user of the host computer 104, on which the example host manager 112 operates, navigates to a first network address to request a download of an application from the example mirror host 106 (452). In response to the request, the mirror host 106 transmits the application back to the host computer 104 (454), which prompts the example host manager 112 to initialize a shadow environment 456, as described in further detail below. At least one requirement established by the shadow environment 456 is that any and all communication to and/or from the downloaded application must occur via the network address from where the downloaded application originated. In other words, the host manager 112 only allows communication from the downloaded application to occur via the first network address associated with the example mirror host 106.

The downloaded application, and/or the example host manager 112 requests authorization to allow the application to execute on the host computer 104 (458). As described above, the request and/or any other communication from the host computer 104 can only occur via the network address associated with the example mirror host 106, which forwards the request to the example address trust manager 110 (460). The example address trust manager 110 may reside on a computer and/or server associated with the author of the application downloaded by the example host computer 104. For example, if the application downloaded from the mirror host 106 is a word processing application by Microsoft®, then the address trust manager 110 may reside on one or more computing resources owned and/or otherwise managed by Microsoft®.

The example request (460) includes the network address of the example mirror host 106 and, in some examples, the network address of the host computer 104. When the example address trust manager 110 receives the example request (460), the address trust manager 110 verifies whether or not the network address associated with the mirror host 106 is authorized to distribute, mirror and/or otherwise provide the application to users (462). If so, then the example address trust manager 110 signs an authentication message and sends it to the example mirror host 106 (464). In some examples, the address trust manager 110 may also send one or more alternate network addresses along with the signed authentication message (464). As described above, the one or more alternate network addresses may allow the user of the application at the example host computer 104 to continue to use the application and/or receive updates, features, services, etc. even if the mirror host 106 is subsequently deemed an untrustworthy entity.

The example mirror host 106 receives the signed authentication message (464) and forwards it to the example host manager 112 (466). The example host manager 112 verifies the signed authentication message (468) and, if the authentication attempt(s) succeed, the example host manager 112 permits limited execution of the application (470). In the event that the address trust manager 110 provided one or more alternate network addresses, then one or more request(s) for updates (472, 474) may occur without intervention and/or participation from the example mirror host 106.

The machine readable instructions 500 of FIG. 5A begin at block 502 where the example host manager 112 of the example host computer 104 identifies that navigation to a first network address has occurred to download an application. In response to detecting that an application was downloaded from the first network address, the example session manager 302 initializes a shadow environment to permit application execution (block 504). Initializing and/or otherwise creating the shadow environment includes invoking the example shadow manager 304 to generate a shadow registry and/or a shadow file system.

In some examples, the shadow manager 304 locates the registry of the host computer 104 and makes an identical copy for use by the application in the shadow environment. Similarly, the shadow manager 304 may locate the file system of the host computer 104 and/or one or more files within the file system and make an identical copy for use by the application in the shadow environment. In other examples, the shadow manager 304 makes partial copies of the registry and/or file system of the host computer 104. Generally speaking, the example shadow environment is created by the example host manager 112 to provide an illusion to the application that it is executing on the example host computer 104. However, any attempts to modify the registry and/or file system and/or any other resources of the host computer 104 occur in the shadow environment, thereby minimizing and/or eliminating corruption to the host computer 104 due to malicious behavior of the application.

In the illustrated example of FIG. 5A, initializing the shadow environment for the application (block 504) also includes setting one or more resource permissions for the application. For example, the example session manager 302 may set a CPU utilization threshold and/or set a memory utilization threshold. The CPU and/or memory utilization thresholds allow a degree of safeguarding against malware that is designed to cripple a user's computer. As described in further detail below, the example host manager 112 may monitor the application execution for such malicious behavior and/or other behaviors indicative of malicious intent.

To minimize and/or eliminate the possibility of an application using one or more network resources to propagate malware throughout an intranet, Internet and/or other network, the example session manager 302 extends sandbox communication privileges of the sandbox session environment to the first network address (block 506). Any attempts by the application to communicate to a network address other than that of the first network address (i.e., the address from which the application was downloaded) will be blocked by the session manager 302 to prevent the possibility of malware propagation.

The application is permitted to execute within the shadow environment (block 508) and the example session monitor 306 qualifies the application by monitoring its behavior (block 510). Turning to FIG. 5B, the example session manager 302 sends an authorization request message using the first network address (block 512). The first network address may be in an IPv6 format having a packet header and a payload. The packet header may include multiple destination addresses, the first of which is associated with the third party mirror site that permitted the application download, and the second destination address including a network address for the application developer 102. As described above in connection with FIG. 4A, the address trust manager 110 receives the request from the session manager 302 and responds with a signed authorization message if the third party mirror site was an approved site to distribute the application (see FIG. 4A, block 416).

If the example session manager 302 receives an indication of first network address authentication (block 514), then the example session manager 302 also determines whether a list of alternate/additional authorized network addresses were received (block 516). If so, then the addresses are stored in a secondary shadow registry, which is inaccessible to the application (block 518). Preventing access to the alternate/additional authorized network addresses minimizes the chances that the application, if tainted with malware, can spoof the authorized address(es) to circumvent authorization of the application. After storing the alternate/additional addresses in the secondary shadow registry (block 518), or if no alternate/additional addresses were received (block 516), the example session monitor 306 monitors the application for an instance of behavior violation (block 520). Application qualification by the example session monitor 306 may be performed in view of violation signatures from the example violation signature database 308. For example, the violation signature database 308 may store information indicative of patterns of malicious program behavior, such as repeated attempts to communicate with known rogue websites, repeated attempts to access system files unrelated to the application functionality, and/or other patterns of behavior indicative of malicious intent.

If the example session monitor 306 does not identify an instance of application behavior violation (block 520), the session monitor 306 determines whether to continue to monitor for one or more violations (block 522). In some examples, the application may be monitored for a threshold period of time (e.g., seconds, minutes, days, weeks, months, etc.) before it is deemed safe for full access to resources of the host computer 104 (block 522). In the event that no violations are detected during application execution in the sandbox session environment (block 520) for a threshold period of time (block 522), then the session monitor 306 may relinquish access to the real registry and/or file system of the host computer 104 (block 524). In other words, the example host manager 112 hands-off the application to the full resources of the host computer 104 after determining that the application is safe. As such, the example host manager 112 deconstructs the shadow environment (block 526).

In the event that an indication of first network address authentication is not received (block 514), then the example sandbox manager deconstructs the sandbox session environment, deletes the application, deletes shadow resources previously created (e.g., the shadow registry, shadow file system, etc.), and relinquishes resources back to the host (block 528).

Figure 6:
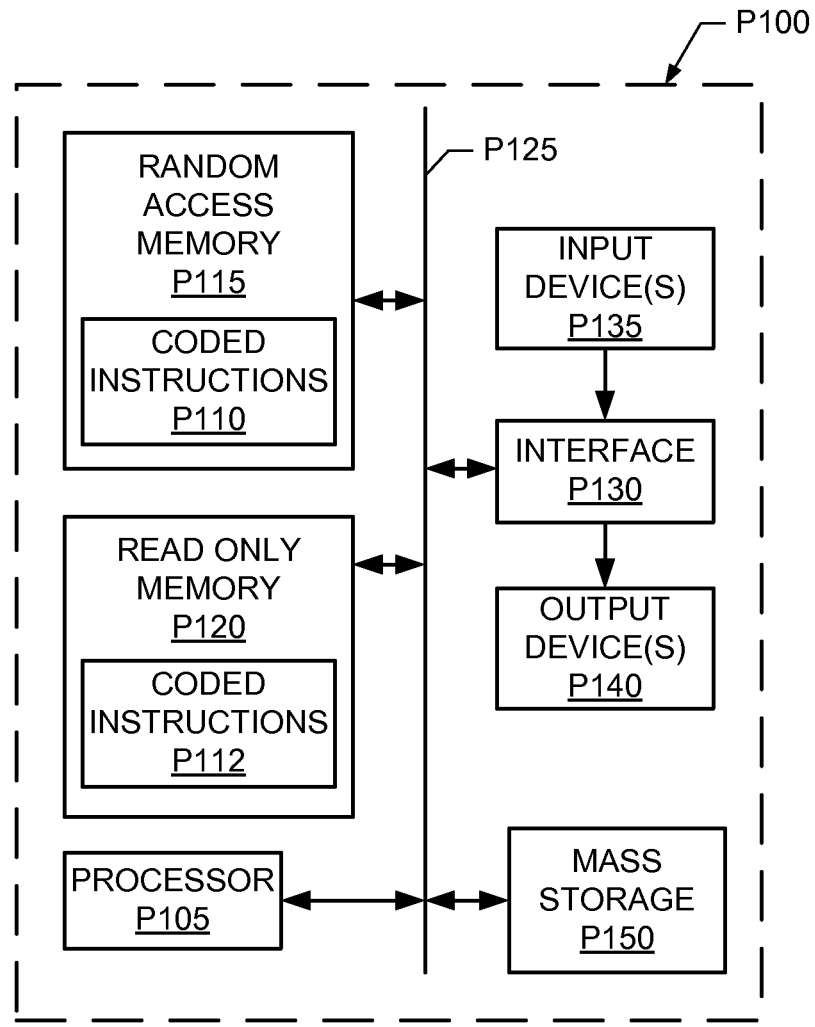
FIG. 6 is a schematic illustration of an example processor platform that may execute the instructions of FIGS. 4A, 5A and 5B to implement any or all of the example system, methods and apparatus described herein.

FIG. 6 is a schematic diagram of an example processor platform P100 that may be used and/or programmed to implement the machine readable instructions of FIGS. 4A, 5A and 5B and any or all of the example address trust manager 110, the example mirror host request monitor 202, the example mirror host database 204, the example address associator 206, the example shadow environment communicator 208 and/or the example trusted address database 210 of FIG. 2, and/or the example host manager 112, the example session manager 302, the example shadow manager 304, the example session monitor 306, the example violation signature database 308 and/or the example encryption/decryption engine 310 of FIG. 3. The processor platform P100 can be, for example, a server, a personal computer, an Internet appliance, a set top box, an Internet-enabled television, or any other type of computing device.

The processor platform P1000 of the instant example includes a processor P105. For example, the processor P105 can be implemented by one or more Intel® microprocessors from the Pentium® family, the Itanium® family or the XScale® family. Of course, other processors from other families are also appropriate.

The processor P105 is in communication with a main memory including a volatile memory P115 and a non-volatile memory P120 via a bus P125. The volatile memory P115 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory P120 may be implemented by flash memory and/or any other desired type of memory device. Access to the main memory P115, P120 is typically controlled by a memory controller (not shown).

The computer P100 also includes an interface circuit P130. The interface circuit P130 may be implemented by any type of interface standard, such as an Ethernet interface, a universal serial bus (USB), and/or a PCI express interface.

One or more input devices P135 are connected to the interface circuit P130. The input device(s) P135 permit a user to enter data and commands into the processor P105. The input device(s) can be implemented by, for example, a keyboard, a mouse, a touchscreen, a track-pad, a trackball, isopoint and/or a voice recognition system.

One or more output devices P140 are also connected to the interface circuit P130. The output devices P140 can be implemented, for example, by display devices (e.g., a liquid crystal display, a cathode ray tube display (CRT), a printer and/or speakers). The interface circuit P130, thus, typically includes a graphics driver card.

The interface circuit P130 also includes a communication device (e.g., sandbox communicator 208) such as a modem or network interface card to facilitate exchange of data with external computers via a network (e.g., an Ethernet connection, a digital subscriber line (DSL), a telephone line, coaxial cable, a cellular telephone system, the network 108 of FIG. 1, etc.).

The computer P100 also includes one or more mass storage devices P150 for storing software and data. Examples of such mass storage devices P150 include floppy disk drives, hard drive disks, compact disk drives and digital versatile disk (DVD) drives. The mass storage device P150 may implement the example mirror host database 204, the example trusted address database 210 and/or the example violation signature database 308.

The coded instructions P110, P112, such as the machine readable instructions of FIGS. 4A, 5A and 5B, may be stored in the mass storage device P150, in the volatile memory P115, in the non-volatile memory P120, and/or on a removable storage medium such as a CD or DVD.

From the foregoing, it will appreciate that the above disclosed methods, systems, apparatus and articles of manufacture facilitate minimization and/or prevention of malware propagation. In particular, in the event an anti-virus application fails to detect malware, or in the event an anti-virus signature detection library is not up-to-date, the methods, systems, apparatus and articles of manufacture prevent malicious code from affecting the example host computer 104.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus to authorize an application, comprising:
an address trust manager to obtain a first network address having a request for address authentication from a first entity, the request including a second network address associated with a second entity, the second entity having downloaded the application from the first entity via the first network address;
an address associator to compare the first network address to addresses in a trusted address database to determine whether the first network address is trusted; and
a shadow environment communicator to generate a signed message based on the comparison, at least one of the address trust manager, the address associator, or the shadow environment communicator including a logic circuit, the address trust manager to:
in response to a match in the trusted address database, transmit the signed message with an indication of authorization to the second entity via the first network address; and
in response to a lack of a match in the trusted address database, transmit the signed message with an indication of non-authorization to the second entity via the first network address.

2. The apparatus as defined in claim 1, wherein the shadow environment communicator is to send a third network address via the first network address, the third network address to facilitate a bypass of the first entity when communicating with the second entity.

3. The apparatus as defined in claim 1, wherein the shadow environment communicator is to send the signed message to the second entity to deconstruct a shadow environment on the second entity when the address associator does not find the match in the trusted address database, the deconstruction of the shadow environment to prevent the application from executing on the second entity.

4. The apparatus as defined in claim 3, wherein the shadow environment is to permit execution of the application on the second entity using virtual resources.

5. The apparatus as defined in claim 1, further including a mirror host request monitor to identify whether the application was downloaded from the first entity at a first time or a second time.

6. The apparatus as defined in claim 5, wherein the first entity is deemed trusted at the first time and the first entity is deemed untrusted at the second time.

7. The apparatus as defined in claim 6, wherein the shadow environment communicator is to generate the signed message with the indication of authorization if the application was downloaded from the first entity at the first time, the first time indicative of the first entity being trusted.

8. The apparatus as defined in claim 6, wherein the shadow environment communicator is to generate the signed message with the indication of non-authorization if the application was downloaded from the first entity at the second time, the second time indicative of the first entity being untrusted.

9. A method to authorize an application, comprising:
obtaining, by executing an instruction with a processor, a first network address from a request for address authentication from a first entity, the request including a second network address associated with a second entity, the second entity having downloaded the application from the first entity via the first network address;
comparing, by executing an instruction with the processor, the first network address to addresses in a trusted address database to determine whether the first address is trusted;
generating, by executing an instruction with the processor, a signed message based on the comparison;
in response to a match in the trusted address database, transmitting the signed message with an indication of authorization form the processor to the second entity via the first network address; and
in response to a lack of a match in the trusted address database, transmitting the signed message with an indication of non-authorization from the processor to the second entity via the first network address.

10. The method as defined in claim 9, wherein the first entity includes a third party mirror host to provide the application to the second entity.

11. The method as defined in claim 9, wherein the second entity includes a host computer.

12. The method as defined in claim 9, further including identifying whether the application was downloaded from the first entity at a first time or a second time.

13. The method as defined in claim 12, wherein the first entity is deemed trusted at the first time and the first entity is deemed untrusted at the second time.

14. The method as defined in claim 13, further including generating the signed message with the indication of authorization if the application was downloaded from the first entity at the first time, the first time indicative of the first entity being trusted.

15. The method as defined in claim 13, further including generating the signed message with the indication of non-authorization if the application was downloaded from the first entity at the second time, the second time indicative of the first entity being untrusted.

16. A computer-readable storage device comprising instructions that, when executed, cause a machine to perform operations comprising:
accessing a first network address from a request for address authentication from a first entity, the request including a second network address associated with a second entity, the second entity having downloaded the application from the first entity via the first network address;
comparing the first network address to address in a trusted address database to determine whether the first address is trusted;
generating a signed message based on the comparison;
in response to a match in the trusted address database, transmitting the signed message with an indication of authorization to the second entity via the first network address; and
in response to a lack of a match in the trusted address database, transmitting the signed message with an indication of non-authorization to the second entity via the first network address.

17. The computer-readable storage device as defined in claim 16, wherein the instructions, when executed, cause the machine to send the signed message to the second entity to deconstruct a shadow environment on the second entity when the match is not found in the trusted address database, the deconstruction of the shadow environment to prevent the application from executing on the second entity.

18. The computer-readable storage device as defined in claim 17, wherein the instructions, when executed, cause the machine to permit the shadow environment to execute the application on the second entity using virtual resources.

19. The computer-readable storage device as defined in claim 16, wherein the instructions, when executed, cause the machine to identify whether the application was downloaded from the first entity at a first time or a second time.

20. The computer-readable storage device as defined in claim 19, wherein the instructions, when executed, cause the machine to determine the first entity as trusted at the first time and determine the first entity is untrusted at the second time.

* * * * *